United States Patent
d'Entrecastaux

(10) Patent No.: US 8,891,110 B2
(45) Date of Patent: Nov. 18, 2014

(54) LOW COST OVERNIGHT PRINTING

(75) Inventor: Daryl d'Entrecastaux, Cambridgeshire (GB)

(73) Assignee: Xerox Corporation, Norwalk, CT (US)

( * ) Notice: Subject to any disclaimer, the term of this patent is extended or adjusted under 35 U.S.C. 154(b) by 993 days.

(21) Appl. No.: 12/726,807

(22) Filed: Mar. 18, 2010

(65) Prior Publication Data

US 2011/0228313 A1 Sep. 22, 2011

(51) Int. Cl.
*G06F 3/12* (2006.01)
(52) U.S. Cl.
CPC ............ *G06F 3/1285* (2013.01); *G06F 3/1211* (2013.01); *G06F 3/1267* (2013.01)
USPC ....... 358/1.15; 358/1.13; 358/1.14; 358/1.16; 358/1.18
(58) Field of Classification Search
USPC ............. 358/1.15, 1.13, 1.1, 1.14, 1.16, 1.18; 700/295; 347/3, 104
See application file for complete search history.

(56) References Cited

U.S. PATENT DOCUMENTS

| | | | |
|---|---|---|---|
| 5,796,930 A * | 8/1998 | Gauthier et al. | 358/1.17 |
| 6,295,117 B2 * | 9/2001 | Haraguchi et al. | 355/40 |
| 8,237,964 B2 * | 8/2012 | Fan et al. | 358/1.15 |
| 2002/0120659 A1 * | 8/2002 | Parry | 709/100 |
| 2009/0002761 A1 * | 1/2009 | La et al. | 358/1.16 |
| 2009/0326728 A1 * | 12/2009 | Chrisop et al. | 700/295 |
| 2010/0017242 A1 * | 1/2010 | Hamilton et al. | 705/8 |
| 2011/0058211 A1 * | 3/2011 | Noecker et al. | 358/1.15 |

* cited by examiner

*Primary Examiner* — Allen H Nguyen
(74) *Attorney, Agent, or Firm* — Fox Rothschild LLP

(57) ABSTRACT

A method and system for scheduling printing times for print jobs at least one printing device. The method and system include determining, at a processing device operably connected to a printing device, at least one non-peak time period; receiving, at a printer queue stored on a computer readable medium operably connected to a printing device, a first plurality of print jobs; storing, at the printer queue, a first subset of the plurality of print jobs until the non-peak time period; and printing, at the printing device, each of the stored print jobs during the non-peak time period.

14 Claims, 4 Drawing Sheets

LOW COST OVERNIGHT PRINTING

BACKGROUND

The present disclosure relates to scheduling print jobs. More specifically, the present disclosure relates to scheduling non-essential print jobs to be processed at a time when the cost of electricity is not at its peak.

Many office devices such as printers, copiers and multi-function devices (e.g., a single device capable of scanning, printing, faxing and/or copying) utilize a printer driver and printer queue for processing any incoming print jobs. For example, when a user wishes to print a document, the user accesses the printer driver via their computer, typically via a graphical interface such as selecting print via a drop down menu in an application. Once the user confirms they would like to print a specific document or job, the job is sent to the printer queue. Here, the print job waits until the printer is able to process and print the queued print job. Generally, a printer queue functions using a first in first out (FIFO) scheduling scheme. Individual print jobs are processed and printed in the order they are received and enter the print queue. Some print systems allow a user to assign a priority to a print job, e.g., a high priority document to be printed immediately. A print job with an assigned priority may be moved to the front of the printer queue, bypassing any print jobs with a lower (or no assigned) priority already in the printer queue.

In a typical office environment, only a portion of print jobs are for immediate use. The remaining print jobs are documents that are being printed in advance of the documents being needed, such as an employee printing a large set of documents for review the next day. These documents are often given no priority, and are processed by the printer driver through the printer queue according to the standard FIFO scheduling scheme.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

in one general respect, the embodiments disclose a method for scheduling printing times for print jobs at least one printing device. The method includes determining, at a processing device operably connected to a printing device, at least one non-peak time period; receiving, at a printer queue stored on a computer readable medium operably connected to a printing device, a first plurality of print jobs; storing, at the primer queue, a first subset of the plurality of print jobs until the non-peak time period; and printing, at the printing device, each of the stored print jobs during the non-peak time period.

In another general respect, the embodiments disclose a system for scheduling printing times for print jobs at least one printing device. The system includes a printer queue stored on a computer readable medium and a printing device operably connected to the print queue. The printer queue is configured to receive a plurality of print jobs, and store a first subset of the plurality of print jobs until a non-peak time period, while the printing device is configured to determine at least one non-peak time period, and print each of the stored jobs during the non-peak time period.

In another general respect, the embodiments disclose a method for scheduling printing times for print jobs at least one printing device. The method includes determining, at a processing device operably connected to a printing device, at least one non-peak time period; receiving, at a printer queue stored on a computer readable medium operably connected to a printing device, a plurality of print jobs; for each print job, classifying, at the printing device, the job as one of an immediate print job and a delayed print job; printing, at the printing device, each immediate print job substantially when the immediate print job is received; storing, at the printer queue, each delayed print job until the non-peak time period; and printing, at the printing device, each delayed print job during the non-peak time period.

DETAILED DESCRIPTION

Figure 1:
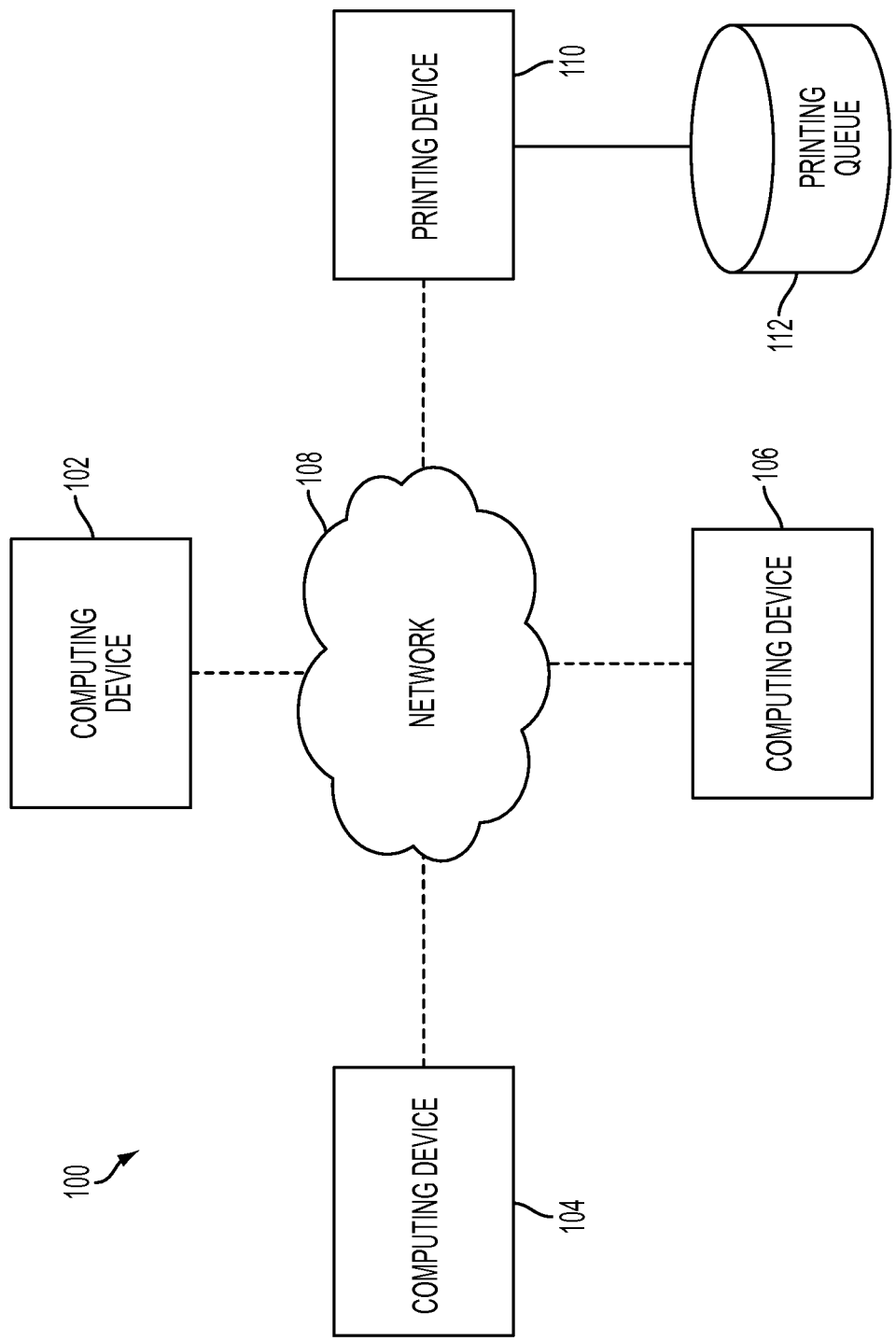
FIG. 1 illustrates an exemplary office environment including multiple computing devices sharing a single printing device according to an embodiment.

A "printing device" is an electronic device that is capable of receiving commands, and/or printing text characters and/or images on a substrate, and/or scanning images. Printing devices may include, but are not limited to, network printers, production printers, copiers and other devices using ink or toner, and scanners. A printing device may also perform a combination of functions such as printing/scanning, in which case such a device may be considered a multifunctional device.

A "computing device" refers to a device that processes data in order to perform one or more functions. A computing device may include any processor-based device such as, for example, a server, a personal computer, a personal digital assistant, a web-enabled phone, a smart terminal, a dumb terminal and/or other electronic device capable of communicating in a networked environment. A computing device may interpret and execute instructions.

A "print job" is one or more documents accessed at a computing device and requested by a user to be printed at a printing device.

A "printer driver" refers to a set of computer instructions operably configured to instruct a processor of a printing device to process and print a document or print job.

A "printer queue" is a data structure stored on a computer readable medium and configured to temporarily hold one or more print jobs until a print device can process and print the print jobs.

"Peak time" refers to a period of time where a resource such as electricity is at a high billing rate. This may be due to consumption levels, time of day, costs to produce the resource, or various other reasons. One example may be electricity. From 8:00 AM until 10:00 PM, a utility company may define this period as a peak time and charge a higher rate for any electricity used during this peak time period.

Alternatively, "Non-Peak time" refers to a period of time where a resource such as electricity is at a low billing rate. This may be due to low consumption levels, time of day, or various other reasons. To continue the above example, from 10:00 PM until 8:00 AM, a utility company may define this period as a non-peak time and charge a lower rate for any electricity used during this peak time period.

Recently, many businesses are striving to be more "green" or environmentally friendly. Typical green business try to reduce wasted resources such as power consumption. Similarly, many utility companies price utility service according to a smart schedule to encourage businesses to reduce or reschedule utility consumption or usage. A smart schedule defines peak and non-peak times for using any given utility. To continue the above example, an electric company may define peak electrical usage times as between 8:00 AM and 10:00 PM, and non-peak times between 10:00 PM and 8:00 AM. These time periods may be decided based upon current utility usage information such as average power consumption during those time periods. The peak and non-peak time periods may also be agreed upon between a utility company and a business. For example, a business and a utility company may agree that any time between 10:00 PM and 8:00 AM is a non-peak time period. Similarly, the business and the utility company may agree that weekends are non-peak time periods. Financial incentives may be offered to a business to shift some of their utility usage to non-peak times. For example, that same electric company may offer cheaper rates during the non-peak time as less overall power is consumed by other customers during that time period. As such, it is more efficient for the electric company to supply power to the business during non-peak times, and it is also more efficient and greener, via cost and resource savings, for the business to use less power during peak time periods.

FIG. 1 illustrates a block diagram of an exemplary system 100 for accessing a single printing device from various computing devices. As shown in FIG. 1, the system 100 may include multiple computing devices 102, 104, and 106, operably connected to a printing device 110 via a network 108. The network 108 may include, but is not limited to, a local area network (LAN), a wide area network (WAN), the Internet, an intranet and/or any other communications network. It should be noted that a single printing device 110 is shown by way of example only. In a typical system, multiple printing devices may be utilized; however, to simplify the example, a single printing device 110 will be discussed. The printing device 110 may include a memory configured to store a printer driver as well as a processor operably connected to the memory. The printer driver may instruct the processor to perform various functions such as printing a document.

As discussed above, in a typical system, a user wishing to print a document from one of the computing devices 102, 104, or 106 would access a printer driver configuration page for printing device 110. When the user selects to print the document, the associated print job may be placed in a printer queue 112 for processing and printing. The printer queue 112 may be a storage device integrated in the printing device and operably connected to the processor of the printing device. Alternatively, the printer queue 112 may be a storage device remotely located in, for example, a print server and operably connected to the printing device 110 via a communications network.

In a typical system such as those discussed above, a printer queue typically operates using a first in first out (FIFO) scheduling scheme. However, printer queue 112 may be configured to allow the user to select when the print job may be processed and printed. Specifically, the user may be given an option to print the document overnight, or during a time period when electricity (and any other required utility) is at non-peak pricing.

Figure 2:
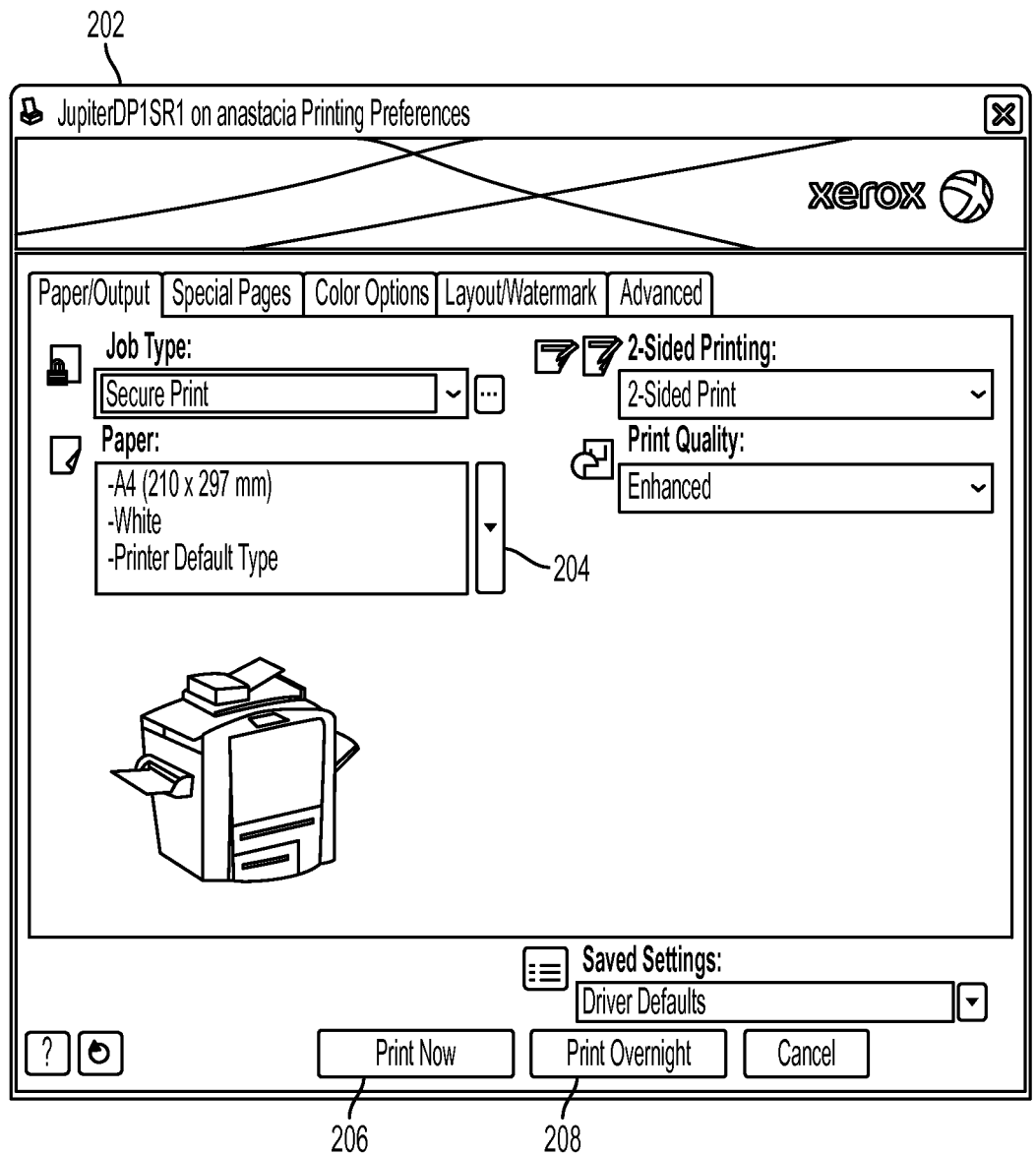
FIG. 2 illustrates an exemplary printing preferences configuration screenshot according to an embodiment.

FIG. 2 illustrates an exemplary printer preferences configuration page 202 for communicating with a selected printer driver as it may be presented to a user at computing device 102, 104, or 106 via an application based user interface or similar user interface (UI). The printer preferences configuration page 202 may include various selectable attributes 204 such as job type, paper size, two-sided printing, print quality and other related attributes. Once a user has selected any attributes 204, the user may then select a printing option. In this example, two printing options are provided, an option to print immediately such as print now 206, and an option to print at a non-peak time period such as print overnight 208. If print now 206 is selected, the print job may be tagged for immediate printing. If print overnight 208 is selected, the printer queue may hold the document until a non-peak period begins, such as an overnight period. An overnight time period may be defined by an administrator based upon a non-peak billing rate as defined by a utility company, or the overnight time period may be chosen as an arbitrary time when all non-essential print jobs are processed and printed.

It should be noted that both options immediate print option print now 206 and non-peak print option print overnight 208 are given by way of example. In a system such as system 100, various users may have different roles assigned to them. These roles may determine whether the user is given the option to print at a non-peak time period or not. For example, a president of a company may never be given the option to print at a non-peak time period. Rather, everything printed by the president may be consider high priority and is printed immediately. Conversely, a newly hired employee may only have the option to print at a non-peak time period. Various combinations of options may be used for additional employees depending on the business or company structure.

Figure 3:
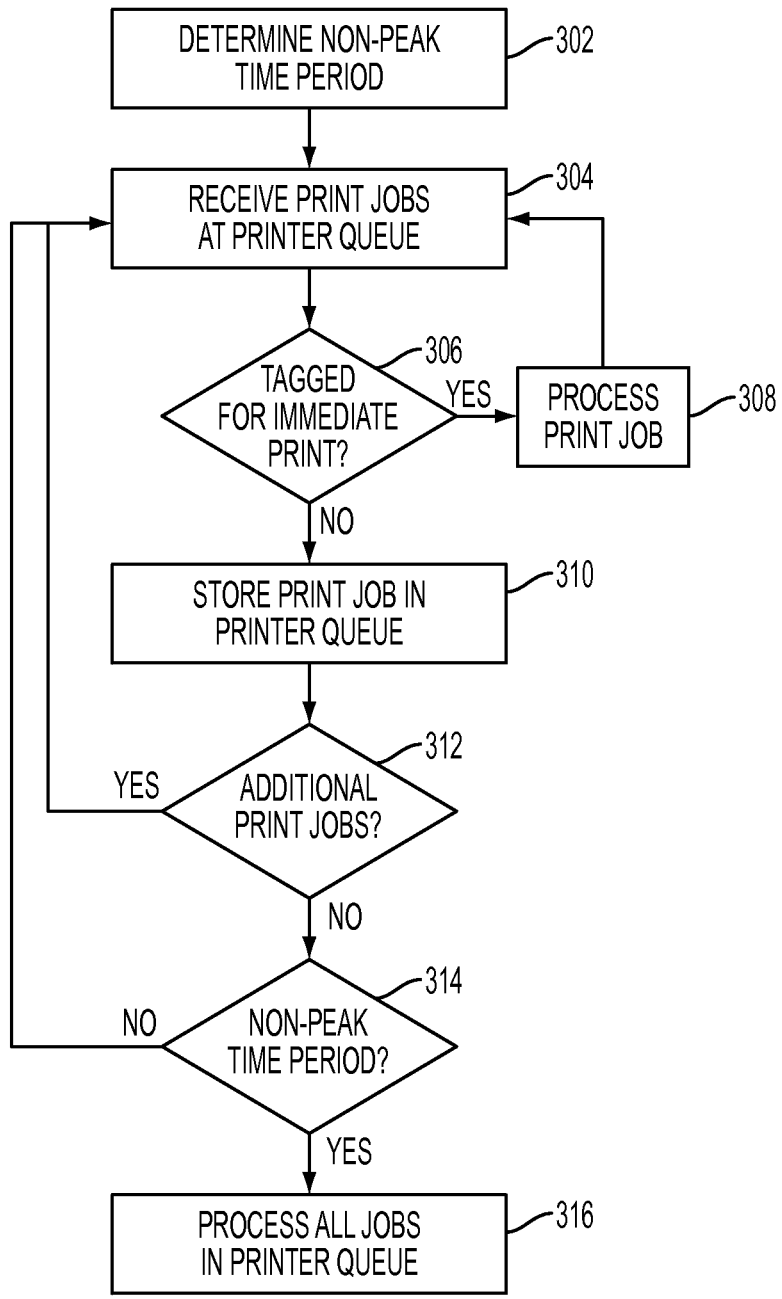
FIG. 3 illustrates a flow diagram of an exemplary method for scheduling printing jobs for non-peak time periods according to an embodiment.

FIG. 3 illustrates a flow diagram of an exemplary method for scheduling printing jobs for non-peak time periods. An overnight or non-peak period may be determined 302 based upon usage characteristics or information relating to the printing device. The non-peak time period may also be determined 302 based upon when a particular utility, such as electricity, is at a low cost or non-peak billing period. This determination 302 may be performed automatically by a software module configured to connect to a utility provider's web site and access various billing information or tee schedules. This determination 302 may also be made by an administrator selecting a time period that will be considered non-peak for all queued print jobs. The non-peak time period may be determined 302 once for all printing devices, or may be determined intermittently. Once the non-peak time period is determined 302, the printer queue may receive 304 various print jobs. The incoming jobs may include both a subset of jobs that are to be printed immediately, and a subset of jobs to be delayed for printing during the non-peak time period. Each print job may be evaluated to determine 306 and classify whether the print job is tagged for immediate printing or if the print job is to be delayed until a non-peak time period. If the print job is tagged for immediate printing, the tagged print job is processed 308 and printed. If the print job is not tagged for immediate printing, the print job may be stored 310 in the printer queue for non-peak printing.

The printing device may determine 312 whether there are any additional incoming print jobs. If there are additional incoming print jobs, the print jobs may be received 304 at the printer queue and evaluated to determine 306 whether the additional print jobs are tagged for immediate printing. As discussed above, if a print job is tagged for immediate printing, the print job may be immediately processed 308. If the print job is not tagged, the print job may be stored 310 in the printer queue. This process may repeat until the printing device determines 312 there are no additional print jobs.

The printing device may determine 314 whether the non-peak time period has begun. If the non-peak time has not begun, the printing device may continue to receive 304 additional print jobs at the printer queue. If the printing device determines 314 the non-peak time period has begun, the printing device may process 316 all print jobs in the printer queue.

Depending on the system architecture and design, when processed 316 by the printing device the print job may be raster image processed. During raster image processing, the print job is converted from a high level data format such as a text document to a data format easily handled by the printing device such as compressed binary. Raster image processing may be a time and computational resource intensive process and performing the raster image processing at a non-peak time period may save additional resources.

Multiple approaches may be used to incorporate the raster image processing. In one example, the print jobs may be held in a remote printing queue until the non-peak time occurs. During the non-peak time, the print jobs may be passed to an internal print queue in the printing device, be raster image processed, and printed. In an alternative example, the print jobs may be passed from the remote printing queue to the local queue regardless of the time. The print jobs may then be held in the local queue until the non-peak time period at which time the jobs will be raster image processed and printed. In yet another example, the print jobs may be raster image processed at the remote queue, thereby limiting the printing device to printing the print jobs.

In addition to scheduling print jobs at a time when electricity is cheapest, the process described in FIG. 3 may also save money and energy by reducing the overall power required by the printing device to print each print job. Typically, a printing device has to perform a short warm-up cycle before processing a print job. During this warm-up cycle, various functions may occur. If the printing device is a laser printer, a fuser in the printing device may need to heat up before printing. Additionally, any print heads or ink applying devices may need to align, paper levels may need to be determined, and various other warm-up functions may be performed. By grouping a number of print jobs in the printer queue into a single batch job, a single warm-up cycle may be performed as opposed to numerous warm-up cycles throughout the day as would typically be performed if each print job were printed immediately.

Additionally, by using the process discussed in FIG. 3, paper may be conserved as a user may determine that a previously submitted print job is unnecessary and may be cancelled. As the print job has been queued until the non-peak time period, the user may access the printer queue and cancel the print job.

Figure 4:
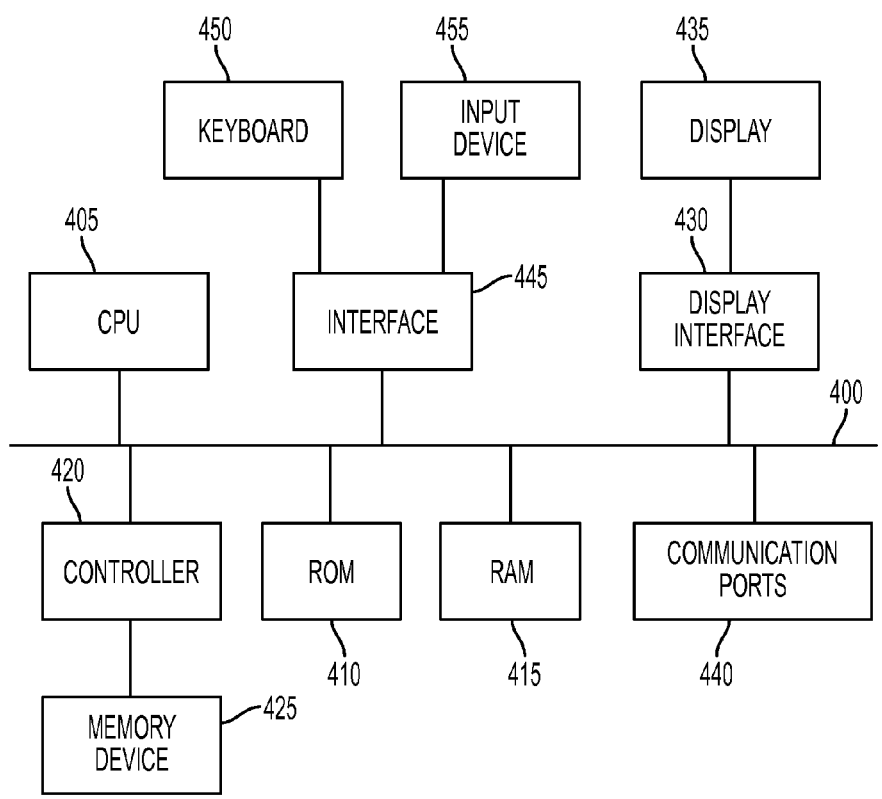
FIG. 4 illustrates various embodiments of a computing device for implementing the various methods and processes described herein.

The printer preferences configuration screen used to access and communicate with a particular printer driver as described above may be presented on a display based on software modules including computer-readable instructions that are stored on a computer readable medium such as a hard drive, disk, memory card, USB drive, or other recording medium. FIG. 4 depicts a block diagram of exemplary internal hardware that may be used to contain or implement program instructions such as the steps for scheduling a print job as discussed above in reference to FIGS. 2 and 3. A bus 400 serves as the main information highway interconnecting the other illustrated components of the hardware. CPU 405 is the central processing unit or processing device of the system, performing calculations and logic operations required to execute a program. Read only memory (ROM) 410 and random access memory (RAM) 415 constitute exemplary memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices.

Program instructions may be stored in the ROM 410 and/or the RAM 415. Optionally, program instructions may be stored on a tangible computer readable medium such as a compact disk, a digital disk, flash memory, a memory card, a USB drive, an optical disc storage medium, such as Blu-ray™ disc, and/or other recording medium.

An optional display interlace 430 may permit information from the bus 400 to be displayed on the display 435 in audio, visual, graphic or alphanumeric format. Communication with external devices may occur using various communication ports 440. An exemplary communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for scheduling printing times for print jobs at least one printing device, the method comprising:
   determining, at a processing device operably connected to a printing device, at least one non-peak time period, wherein the at least one non-peak time period comprises a time period when energy costs used for powering the at least one printing device are at a minimum;
   receiving, at a printer queue stored on a computer readable medium operably connected to the printing device, a first plurality of print jobs;
   determining a first subset of the plurality of print jobs to be printed during the non-peak time period, wherein the determining is based upon an assigned role of a user submitting each print job and whether the user's assigned role has permission to print their print job during a peak time period;
   determining, at the printing device, a second subset of the plurality of print jobs to be printed immediately upon receipt, wherein the determining is based upon the assigned role of the user submitting each print job and whether the user's assigned role has permission to immediately print their print job;
   storing, at the printer queue, the first subset of the plurality of print jobs until the non-peak time period;
   raster image processing each of the stored print jobs during the non-peak time period; and printing, at the printing device, each of the stored print jobs during the non-peak time period.

2. The method of claim 1, further comprising printing, at the printing device, each of the second subset of the plurality of print jobs when each of the second subset of print jobs is received.

3. The method of claim 1, wherein the determining a non-peak time period when energy costs are at a minimum comprises receiving a fee schedule from a computing device associated with an energy provider.

4. The method of claim 1, wherein the non-peak time period is determined based upon a usage pattern for the printing device.

5. The method of claim 1, wherein the plurality of stored print jobs is printed in a single batch during the non-peak time period, thereby reducing any warm-up cycles of the printing device.

6. A system for scheduling printing times for print jobs at least one printing device, the system comprising:
   a printer queue stored on a computer readable medium and configured to:
      receive a plurality of print jobs, and
      store a first subset of the plurality of print jobs until a non-peak time period; and
   a printing device operably connected to the print queue and configured to:
      determine at least one non-peak time period, wherein the at least one non-peak time period comprises a time period when energy costs used for powering the at least one printing device are at a minimum,
      determine the first subset of the plurality of print jobs to be printed during the non-peak time period, wherein the determining is based upon an assigned role of a user submitting each print job and whether the user's assigned role has permission to print their print job during a peak time period,
      determine a second subset of the plurality of print jobs to be printed immediately upon receipt, wherein the determining is based upon the assigned role of the user submitting each print job and whether the user's assigned role has permission to immediately print their print job,
      raster image process each of the stored print jobs during the non-peak time period, and
      print each of the stored jobs during the non-peak time period.

7. The system of claim 6, wherein the printing device is further configured to print each of the second subset of print jobs when each of the second subset of print jobs is received.

8. The system of claim 6, wherein the printing device is further configured to determine a non-peak time period when energy costs are at a minimum by receiving a fee schedule from a computing device associated with an energy provider.

9. The system of claim 6, wherein the non-peak time period is based upon a usage pattern for the printing device.

10. The system of claim 6, wherein the printing device is further configured to print the plurality of stored print jobs in a single batch during the non-peak time period, thereby reducing any warm-up cycles of the printing device.

11. A method for scheduling printing times for print jobs at least one printing device, the method comprising:
   determining, at a processing device operably connected to a printing device, at least one non-peak time period, wherein the at least one non-peak time period comprises a time period when energy costs used for powering the at least one printing device are at a minimum;
   receiving, at a printer queue stored on a computer readable medium operably connected to the printing device, a plurality of print jobs;
   for each print job, determining, at the printing device, the job as one of an immediate print job and a delayed print job, wherein the determining is based upon an assigned role of a user submitting each print job and whether the user's assigned role has permission to immediately print their print job;
   printing, at the printing device, each immediate print job when the immediate print job is received;
   storing, at the printer queue, each delayed print job until the non-peak time period;
   raster image processing each delayed print job during the non-peak time period; and
   printing, at the printing device, each delayed print job during the non-peak time period.

12. The method of claim 11, wherein the determining a non-peak time period when energy costs are at a minimum comprises receiving a fee schedule from a computing device associated with an energy provider.

13. The method of claim 11, wherein the non-peak time period is determined based upon a usage pattern for the printing device.

14. The method of claim 11, wherein the plurality of stored print jobs is printed in a single batch during the non-peak time period, thereby reducing any warm-up cycles of the printing device.

* * * * *